United States Patent
Engers et al.

(10) Patent No.: US 9,674,275 B1
(45) Date of Patent: Jun. 6, 2017

(54) PROVIDING A FILE SYSTEM INTERFACE TO NETWORK-ACCESSIBLE COMPUTING RESOURCES

(71) Applicant: Amazon Technologies, Inc., Reno, NV (US)

(72) Inventors: Ross Bevan Engers, Cape Town (ZA); Benjamin van der Merwe, Cape Town (ZA); David Daniel de Bruyn, Cape Town (ZA); Natu Lauchande, Cape Town (ZA); Christo Pierre Langenhoven, Cape Town (ZA); Jaco Hermanus Gabriel Le Roux, Cape Town (ZA); Oliver Nigel Nightingale, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 275 days.

(21) Appl. No.: 14/659,311

(22) Filed: Mar. 16, 2015

(51) Int. Cl.
*H04L 29/08* (2006.01)
*H04L 29/06* (2006.01)

(52) U.S. Cl.
CPC .............. *H04L 67/10* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,546,354 B1* | 6/2009 | Fan | ...................... | G06F 11/2025 709/219 |
| 2003/0028731 A1* | 2/2003 | Spiers | ..................... | H04L 49/90 711/147 |
| 2013/0227349 A1* | 8/2013 | Nodir | .................. | G06F 11/0709 714/37 |
| 2014/0297688 A1* | 10/2014 | Sadry | ................ | G06F 17/30091 707/783 |
| 2016/0134616 A1* | 5/2016 | Koushik | ............. | H04L 63/0807 726/9 |

OTHER PUBLICATIONS

Mount (computing), retrieved from http://en.wikipedia.org/wiki/Mount_(computing), on Mar. 17, 2015, 3 pages.
Mount (Unix), retrieved from http://en.wikipedia.org/wiki/Mount_(Unix), on Mar. 17, 2015, 3 pages.

* cited by examiner

*Primary Examiner* — Natisha Cox
(74) *Attorney, Agent, or Firm* — Seed IP Law Group LLP

(57) ABSTRACT

Techniques are described for providing a file system interface for use with network-accessible computing resources (e.g., located in a data center). A client computing device of a user may display information regarding at least some such computing resources to the user using a visual representation of a hierarchical file system (e.g., with the computing resources organized hierarchically), and allow standard file system commands to manipulate the computing resources, despite them not actually being part of a file system. Particular combinations of a file system command and a type of computing resource may be mapped to associated operations, which implement actions for computing resources of that type corresponding to functionality of that file system command. In some situations, the computing resources are provided by an online service, such as a configurable network service providing virtual computer networks to clients.

26 Claims, 10 Drawing Sheets

**Example Client 1 Visual
File System Interface**

**Example File System
Commands By Client 1**      240

```
> cd /home/mary/VCNs
/home/mary/VCNs
240a   > rm VCN-1/node-1-1-2-M
240b   > mv VCN-1/node-1-1-1-2 VCN-2
       > cd VCN-1
       /home/mary/VCNs/VCN-1
240c   > grep "159.23.17.*" *.*
       node-1-2-1-1/virtual-network-interface-A/159.23.17.15
240d   > mv node-1-2-1-1/virtual-network-interface-A node-1-1-2-1
240e   > less node-1-1-2-1
       ...
```

Example CNS Administrative User Visual File System Interface

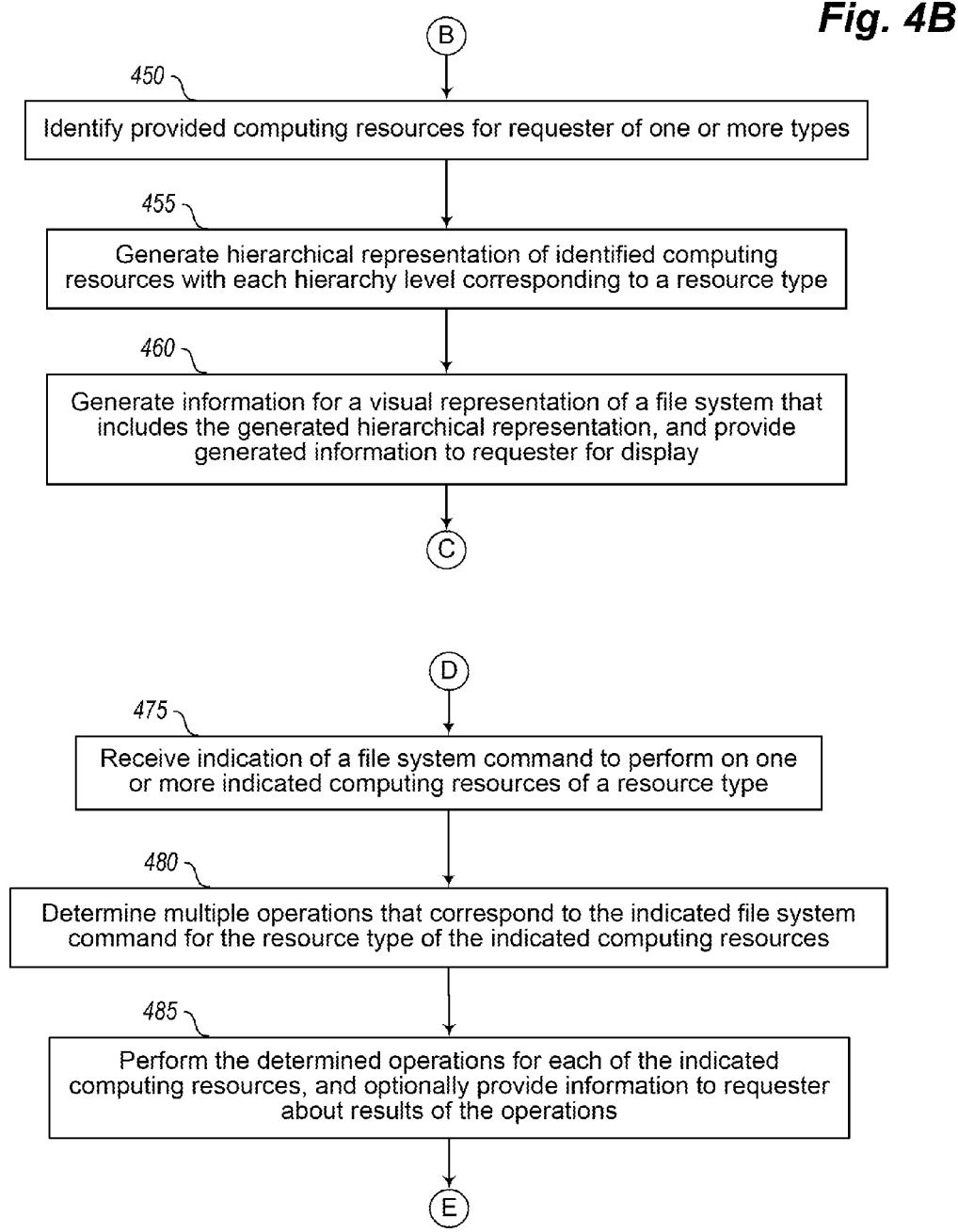

PROVIDING A FILE SYSTEM INTERFACE TO NETWORK-ACCESSIBLE COMPUTING RESOURCES

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 4A-4B illustrate a flow diagram of an example embodiment of a Configurable Network Service (CNS) routine.

DETAILED DESCRIPTION

Figure 1A:
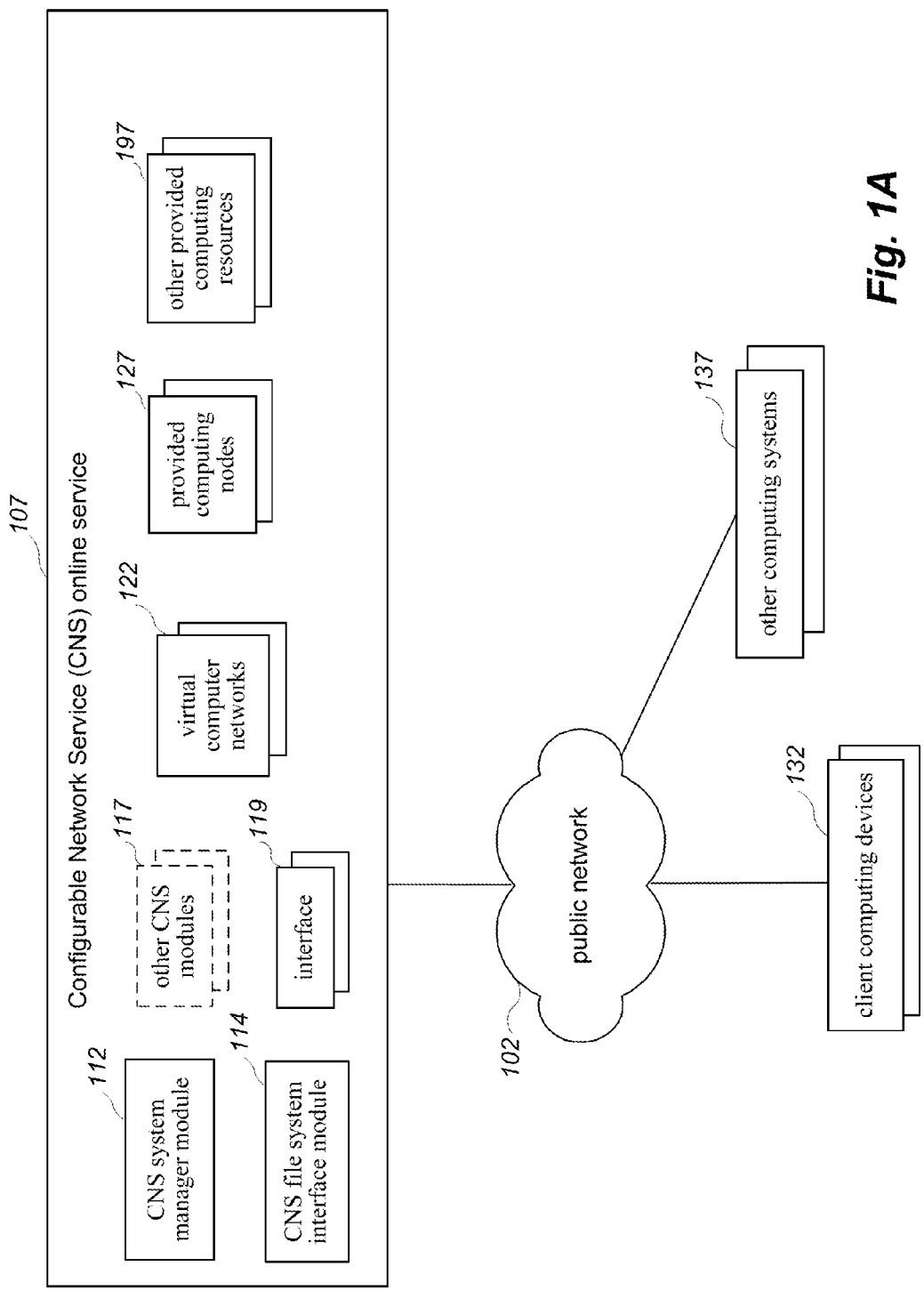
FIGS. 1A-1B are network diagrams illustrating example embodiments of techniques for providing network-accessible computing resources and associated functionality.

Techniques are described for providing a file system interface for use with network-accessible computing resources and associated functionality, such as for computing resources that are located in one or more data centers or that are otherwise grouped together in one or more locations. In particular, a client computing device of a user may obtain information regarding at least some such network-accessible computing resources and associated functionality, and that received information may be displayed to the user on the client device using a visual representation of a hierarchical file system, such as with the network-accessible computing resources being organized in a hierarchical manner in the visual representation. The user may further be able to use standard file system commands to manipulate the network-accessible computing resources and associated functionality, despite such network-accessible computing resources and associated functionality not actually being part of a file system on the client device or elsewhere—for example, particular combinations of a file system command and a type of computing resource may be mapped to associated operations to be performed, with such associated operations implementing actions for computing resources of that resource type that correspond to the type of functionality provided by that file system command. Additional details regarding such techniques are described herein.

In at least some embodiments, some or all of the network-accessible computing resources and associated functionality may be provided by one or more online services to clients of those online services. As one non-limiting example, the online service may be a configurable network service (CNS) that provides virtual computer networks to clients, with each provided virtual computer network having one or more computing nodes provided by the CNS online service, and optionally having various other types of provided computing resources (e.g., virtual network interfaces, actual or logical storage volumes, virtual routers and other networking devices, etc.). In such embodiments, a client may receive information to enable the described file system interface techniques to be used by the client to manipulate network-accessible computing resources, such as for a subset of the network-accessible computing resources of the online service that are being provided for use by the client from the online service. Alternatively, other types of users (e.g., an administrative user representative of the online service) may receive information from the online service (e.g., regarding some or all of the network-accessible computing resources and associated functionality being provided from the online service) to enable the described file system interface techniques to be used by such users to manipulate network-accessible computing resources and associated functionality.

The network-accessible computing resources may be displayed as some or all of a file system in various manners in various embodiments. For example, in embodiments and situations in which such information is displayed to a user on a client device, an existing actual file system on the client device may be displayed to the user, with a visual representation of the computing resources being added to the display in a manner that appears to be a subset of the existing file system. Thus, in a situation in which those computing resources are provided by an online service as part of a data center, some or all of the data center may have a visual representation that is part of a larger visual representation of the client device's file system to make it appear as if the data center has been mounted on the actual file system of the client device or otherwise exists as part of that actual file system, but without the data center and its computing resources actually being part of that file system. It will be appreciated that such a data center, as used herein, may in some situations be a single physical building or other location (or a subset of such a building or location), while in other embodiments and situations may logically span multiple different physical buildings and/or geographical locations. In at least some such embodiments, the display of such information on the client device may be performed in whole or in part by a module of the online service that executes on the client device and that interacts with the online service over one or more intervening computer networks—such a client module may, for example, include software instructions that, when executed by one or more hardware processors of the client device, program or otherwise configure the hardware processors to perform automated operations to implement some or all of the described techniques. Such a client module may be supplied to the client device in various manners, such as by being downloaded or otherwise sent over one or more computer networks, and may further in some embodiments include a software development kit (SDK) or other software that interacts with one or more application programming interfaces (APIs) provided by the online service, as discussed further below.

In other embodiments and situations, information about network-accessible computing resources may be displayed to a user with a visual representation of a file system that is not part of another actual file system. Thus, in a situation in which those computing resources are provided by an online service as part of a data center operated by the online service, some or all of the data center may be presented on a client device to a user by using a visual representation of a file system, but without that visual representation being part of an actual file system (if any) on the client device. In at least some embodiments, the display of such information on the client device may be initiated by information sent to the client device from the online service, such as to a Web browser program or other software on the client device with the capability to display received information—as one non-limiting example, such other software on the client device may include a shell program or other terminal emulator program, such as an existing type of such program that is modified to support some or all of the described techniques. The online service may further be implemented using one or more modules on one or more server computing systems, as discussed in greater detail below—such module(s) of the online service may, for example, include software instructions that, when executed by one or more hardware processors of one or more server computing systems, program or otherwise configure the hardware processors to perform automated operations to implement some or all of the described techniques for providing a file system interface for network-accessible computing resources and associated functionality.

The network-accessible computing resources and associated functionality may be organized in one or more hierarchical representations in various manners in various embodiments. As one example, a hierarchical representation may be used to represent different types of hardware groups of computing resources at different levels of a hierarchy, such as to include successive levels that represent the following: one or more data centers; one or more computer racks within each data center; one or more computing machines or other devices within each rack; one or more virtual machine computing resource configurations within each of at least some such computing machines; etc. As another example, a hierarchical representation may be used to represent different types of functionality being provided, such as by an online service to clients—using a CNS online service as a non-limiting example, successive levels of a hierarchy may represent the following: one or more clients; one or more virtual computer networks provided to each client; one or more computing nodes and/or other devices within each virtual computer network; one or more virtual network interfaces assigned to each computing node and/or other such device; etc. Multiple different hierarchical representations may be provided and used in some embodiments, while only one type of hierarchical representation may be used in other embodiments, and in yet other embodiments information may be displayed about network-accessible computing resources and associated functionality using a file system interface but without including a hierarchical representation of the computing resources and associated functionality in some or all situations. It will also be appreciated that such example hierarchical representations may be modified in various manners (e.g., to include additional levels and/or types of computing resources, to exclude one or more of the described types of levels and/or types of computing resources, etc.), and that various other types of hierarchical representations may be used in other embodiments to organize or categories various types of computing resources and associated functionality. Additional details related to displaying information about network-accessible computing resources and associated functionality using a visual representation of a file system, including using one or more hierarchical representations, are included herein, including with respect to the examples described in FIGS. 2A-2D.

Various types of file system commands for one or more types of operating systems may be supported and used with respect to the network-accessible computing resources and associated functionality in various embodiments, and such file system commands (also referred to generally herein as "operating system file system commands") may perform different types of functionality when applied to at least some types of computing resources relative to their normal functionality when used in a corresponding file system. As one example, a 'list' command (e.g., the 'ls' command in the Unix operating system) may, when applied to a typical directory in a file system, list the contents of that directory. Conversely, if that same 'list' command is applied to a network-accessible computing resource such as a provided virtual computer network, the underlying mapped operations performed may, in at least one embodiment, list other network-accessible computing resources that are part of that provided virtual computer network (e.g., one or more virtual router devices that are configured to be part of the provided virtual computer network, computing nodes that are part of the provided virtual computer network, etc.). Using Unix or Linux types of operating systems as a non-limiting example, at least some file system commands, which are provided by such operating systems and associated with file systems implemented under those operating systems, that may be supported and used with at least some types of computing resources and associated functionality include the following: 'more' and/or 'less', to display information contained within or otherwise associated with one or more indicated computing resources (e.g., an indicated group of multiple associated computing resources, optionally with one or more hierarchical levels, such as a data center or rack, or such as a virtual computer network or one of multiple logical subnets of such a virtual computer network); 'rm', to remove or delete one or more indicated computing resources; 'mv', to move one or more indicated computing resources from a current location to a different specified location (e.g., between different instances of another resource type, such as between virtual computer networks or computing nodes; between different geographical locations, such as different data centers; etc.); 'cp', to make copies of one or more indicated computing resources in a designated destination (e.g., to copy an existing resource at one location to one or more other destination locations); 'grep', to search for one or more computing resources that match one or more indicated criteria; 'chmod', to enable or disable one or more indicated computing resources (e.g., by modifying the 'execute' flag associated with those computing resources), and/or to set access control lists or other access permissions for one or more indicated computing resources; 'setfacl', to set access control lists or other access permissions for one or more indicated computing resources; 'ls', to list computing resources and/or other information that is part of or otherwise associated with one or more indicated computing resources; 'find', to perform a recursive or other search within or under one or more indicated computing resources for one or more indicated criteria; 'ping', to perform a health check or otherwise obtain status information for one or more indicated computing resources; 'duff', to obtain information about differences (e.g., in attributes, such as with respect to their configuration) between two or more indicated computing resources; 'dig', to obtain network-related status information (e.g., configured IP addresses) for one or more indicated computing resources, whether recursively or not; 'chown', to change an owner for one or more indicated computing resources (e.g., between different users of the online service providing the computing resources); etc. It will be appreciated that such example file system commands may be modified in various manners (e.g., to include additional file system commands, to exclude one or more of the described file system commands, etc.), and that other types of operating systems and associated file system commands may be selected and used in at least some embodiments.

The types of functionality associated with such file system commands may be implemented with respect to the network-accessible computing resources and associated functionality in various manners in various embodiments. In particular, for each supported file system command, a determination may be made of one or more associated operations to perform on an indicated computing resource to provide the type of associated functionality for that file system command and that indicated computing resource. Furthermore, such a determination may be made in an least some embodiments based on a type of computing resource, such as to map each combination of a type of computing resource and supported file system command for that computing resource type to one or more determined operations to be performed (e.g., a sequence of such operations or other order of operations to be performed)—thus, in at least some such embodiments, different operations may be mapped to a particular file system command for different types of computing resources.

In addition, in some embodiments, an online service that provides computing resources of one or more types for use by clients may further expose one or more APIs that are each available for use with at least one type of computing resource. In such embodiments, a mapping may be determined or otherwise identified for particular combinations of file system commands and resource types to one or more corresponding APIs, such that applying or executing such a file system command on one or more resources of a resource type includes invoking those mapped one or more corresponding APIs on those one or more resources. For example, performing a copy (e.g., 'cp') for an executing virtual machine ("VM") may include using a first mapped API to create a snapshot of a current state of the VM, and using a second mapped API to run that created snapshot on a new VM, as well as to optionally use one or more additional mapped APIs to perform additional functionality (e.g., to assign a virtual network identifier to that new VM)—conversely, performing a copy (e.g., 'cp') for a stored VM image may include using a different third mapped API to create a stored copy of that VM image. It will also be appreciated that performing some file system commands on some resource types may include recursive operations, including additional invocations of the same or different APIs. For example, if an executing VM that is being copied includes an associated storage volume, the copy of that executing VM may further include executing one or more additional APIs to copy that storage volume and to attach the copied storage volume to the new VM—similarly, if the storage volume had one or more lower-level associated resources, a further recursive copy step for those lower-level resources may be performed. Other non-exclusive examples of such mapped APIs include the following: performing a copy (e.g., 'cp') for a virtual computer network in operation by using one or more first APIs to recursively make copies of each node (e.g., each executing VM being used as a computing node of the virtual computer network) or other resource in the virtual computer network, by using one or more second APIs to execute new instances of those copied resources as part of a new virtual computer network, and optionally by using one or more additional APIs to perform additional related operations to make the new virtual computer network available for use; performing a listing (e.g., 'ls') for a VM or a stored VM image or a storage volume may each include using one or more APIs (possibly different APIs for the different resource types) to obtain information about the contents or other attributes of the resource, including to optionally aggregate information together from multiple API calls for a particular resource before providing the aggregated information for display to a client; performing a remove (e.g., 'rm') for a stored VM image may include using one or more APIs to delete that stored image; performing a remove (e.g., 'rm') for an executing VM may include using one or more APIs (e.g., different from those for the removal of the stored VM image) to terminate the execution of that VM, but without deleting an underlying stored copy of a VM image used for the execution of that VM; etc. In addition, such a determination or other identification of a mapping of one or more APIs or otherwise of one or more operations to execute for a particular combination of file system command and resource type may be performed in various manners in various embodiments, including to be predefined for use with the online service (e.g., based on manual configuration by one or more human operators of the online service), to be automatically determined (e.g., learned by the online service based on patterns of one or more APIs or other operations that are repeatedly executed by clients for resources of particular types), etc.

Using Unix or Linux types of operating systems as a non-limiting example, and the non-limiting example of the 'mv' file system command, a client of a CNS online service could provide instructions to move an indicated computing node that is part of a first virtual computer network provided for the client to a second virtual computer network. If so, mapped operations to be performed for that computing resource type and file system command may in some embodiments include changing an assignment of that indicated computing node to be part of the second virtual computer network (e.g., by removing a virtual network interface for the first virtual computer network that was previously assigned to the computing node, and by creating and assigning a new virtual network interface for the second virtual computer network to the computing node), while in other embodiments the mapped operations may include other types of actions (e.g., selecting and provisioning a new computing node of the CNS online service to be added to the second virtual computer network; capturing a current state of the indicated computing node and loading that state onto the new computing node, including to initiate execution of any software as needed; updating configuration information for the second virtual computer network to add the new computing node; stopping the execution of software on the indicated computing node and otherwise removing it from the first virtual computer network; etc.).

Conversely, mapped operations to be performed for the 'my' file system command and an indicated virtual network interface may merely include changing an assignment of that virtual network interface from a first indicated computing node to a second indicated computing node, such that future communications directed to an IP (Internet Protocol) address assigned to that virtual network interface will be provided to the second indicated computing node. In addition, use of the 'mv' file system command may not be supported for some types of computing resources (e.g., a computer system rack, since it is fixed in a particular physical location within a particular data center) in at least some embodiments.

With respect to the example of the 'rm' file system command for Unix or Linux types of operating systems, the command may be supported to, for example, remove an indicated computing node from a virtual computer network being provided, but not for removing a data center or computer system rack. Mapped operations for removing an indicated computing node from a virtual computer network may include, for example, shutting down or terminating at least some software operations on that computing node (e.g., in the manner discussed above for moving a computing node when a new computing node is provisioned and used), or may instead have other forms (e.g., merely removing an association of that indicated computing node as being part of that virtual computer network, without making any modifications to that indicated computing node at that time). In addition, it will be appreciated that file system commands for some computing resource types may have a recursive effect or otherwise affect other computing resource types—for example, removing a virtual computer network may include deleting all virtual network interfaces created for that virtual computer network, removing each computing node and/or other device that is part of that virtual computer network, and then removing configuration information previously specified for and used with that virtual computer network. Similarly, removing a client, if that file system command is supported, may include removing all virtual computer networks and/or other computing resources that are provided to that client, as well as modifying or deleting account information associated with the client. As with other file system commands, use of the 'rm' file system command may not be supported for some types of computing resources (e.g., a data center, unless the operation causes a shutdown of that data center's operations) in at least some embodiments.

With respect to the examples of the 'grep', 'less' and 'more' file system commands for Unix or Linux types of operating systems, the commands may be supported to, for example, examine and/or retrieve various types of configuration information and/or state information associated with particular computing resource types. For example, with respect to a computing node of a virtual computer network, the mapped operations for such commands may include accessing configuration information for the computing node (e.g., a type of the computing node, an amount of memory that is provided with the computing node, an amount of storage that is provided with the computing node, one or more associated IP addresses, etc.), and using that information in one or more manners consistent with the particular file system command that is specified. In addition to or instead of such configuration information, the mapped operations for such commands may include accessing state information for the computing node (e.g., a CPU utilization of the computing node, an amount of memory that is free or in use for the computing node, an amount of storage that is free or in use for the computing node, a list of processes being executed on the computing node, etc.), and using that information in one or more manners consistent with the particular file system command that is specified. Analogous types of configuration and/or state information may be examined and/or retrieved for other types of computing resources and associated functionality that have corresponding information (e.g., provided virtual computer networks, virtual network interfaces or other virtual objects created by the online service, physical computing machines, racks and other groups of physical computing machines, a data center, clients, authorized users of clients, etc.). As with other file system commands, use of the 'grep', 'less' and 'more' file system commands may not be supported for some types of computing resources in at least some embodiments.

With respect to the examples of the 'chmod' and/or 'setfacl' file system commands for Unix or Linux types of operating systems, the commands may be supported to, for example, set access control lists or other access permissions for one or more indicated computing resources, such as with respect to one or more clients of an online service, one or more authorized users for a particular client, one or more user groups specified for a particular client, etc. For example, with respect to a computing node of a virtual computer network, the mapped operations for such commands may include accessing and modifying configuration information for the computing node, and later using such configuration information to control access to information about the computing node and/or to the ability to manipulate the computing node in particular manners. Analogous types of configuration information may be modified and used for other types of computing resources and associated functionality that have corresponding information (e.g., provided virtual computer networks, virtual network interfaces or other virtual objects created by the online service, physical computing machines, racks and other groups of physical computing machines, a data center, etc.). As with other file system commands, use of the 'grep', 'less' and 'more' file system commands may not be supported for some types of computing resources in at least some embodiments.

It will also be appreciated that such types of mapped operations for particular file system commands and resource types may be modified in various manners (e.g., to include additional operations, to exclude one or more of the described operations, etc.), and that various other types of operations may be used in other embodiments to provide functionality associated with particular types of resources. Additional details related to using file system commands and performing associated mapped operations for network-accessible computing resources and associated functionality are included herein, including with respect to the examples described in FIGS. 2A-2D.

Use of the described techniques may provide various types of benefits, including to provide a more efficient and intuitive user interface for clients of online services and other users to view information about network-accessible computing resources and associated functionality, to modify and otherwise manipulate such network-accessible computing resources and associated functionality, etc.

For illustrative purposes, some embodiments are described below in which specific types of computing resources, file system hierarchies, file system commands, and associated mapped operations are performed, including with respect to using such techniques with an online service that provides virtual computer networks and optionally other computing resources to clients. These examples are provided for illustrative purposes and are simplified for the sake of brevity, and the inventive techniques may be used in a wide variety of other situations, including with other types of online services and for computing resources that are not provided by an online service, some of which are discussed below.

FIG. 1A is a network diagram illustrating an example of a network-accessible configurable network service (CNS) online service that provides client-configurable managed virtual computer networks to clients. After such a managed virtual computer network is configured and provided by the online service for a client of the online service, the client may interact from one or more remote locations with the provided computer network, such as to execute programs on the computing nodes of the provided computer network, to dynamically modify the provided computer network while it is in use, etc. The described techniques for providing a file system interface for use with network-accessible computing resources and associated functionality may be used in some embodiments with such a CNS online service, as discussed in greater detail elsewhere herein, including with respect to the examples of FIGS. 2A-2D.

In particular, in the illustrated example of FIG. 1A, a CNS online service 107 is available that provides functionality over one or more public networks 102 (e.g., over the Internet) to clients (not shown) using client computing devices 132, to enable the clients to access and use managed virtual computer networks provided to the clients by the CNS online service. In particular, a number of clients interact over the public network 102 with a system manager module 112 of the CNS online service 107 in the example of FIG. 1A, to create and configure various managed virtual computer networks 122 being provided by the CNS online service 107. In this example embodiment, the system manager module 112 assists in providing functionality of the CNS online service 107 to the remote clients, such as in conjunction with various optional other modules 117 of the CNS online service 107 (e.g., various manager modules in one or more data centers, client modules on client computing devices of the clients, etc.), in conjunction with various provided computing nodes 127 and/or other provided computing resources 197 (e.g., substrate network router devices, edge devices, etc.) that are used by the CNS online service 107 to provide the managed virtual computer networks 122. In at least some embodiments, the CNS system manager module 112 and at least some other optional modules 117 may execute on one or more computing systems (not shown) of the CNS online service 107, and may provide one or more APIs (application programming interfaces) that enable remote computing systems to programmatically interact with the CNS online service to access some or all functionality of the CNS online service 107 on behalf of clients (e.g., to create, configure, and/or initiate use of managed virtual computer networks 122), such as via a provided interface 119 of the CNS online service. In addition, in at least some embodiments, clients may instead manually interact with the CNS online service (e.g., via a GUI provided by the module 112, such as via another provided interface 119; via client modules, not shown, of the CNS online service executing on the client computing devices 132; etc.) to perform some or all such actions. The public network 102 in FIG. 1A may be, for example, a publicly accessible network of linked networks, possibly operated by distinct parties, such as the Internet.

In addition to the system manager module 112 and optional other modules 117, the CNS online service includes a file system interface module 114 in this example embodiment that performs the described techniques for providing a file system interface for network-accessible computing resources and associated functionality. In other embodiments, such a module 114 may be provided separate from the CNS online service, such as to support computing resources provided by one or more affiliated online services (whether including a CNS online service or not), or to otherwise support computing resources being provided to or otherwise available to a user. In this embodiment, the module 114 may receive and respond to requests from clients (e.g., from Web browser programs executing on client computing devices of the clients) or other users for information about provided computing resources, and may generate and provide response information for display to the client or other user on the client devices. For example, when the request is for a visual representation of some or all of the computing resources provided by the CNS online service, the module 114 may determine one or more hierarchical representations of those provided computing resources, generate a visual representation of a file system that includes at least those determined hierarchical representations, and provide information that includes that generated visual representation (e.g., as part of a Web page) to the requester for display on a client device of the requester. When the request is instead to perform an indicated file system command on one or more indicated computing resources, the module 114 may determine if the file system command is supported for the indicated computing resource(s), and if so determine one or more associated operations to perform that are mapped to that file system command for the indicated computing resource(s), and proceed to initiate performance of those operations for the indicated computing resource(s). In other embodiments, some or all of the functionality of the module 114 may instead be provided via client modules executing on client devices of clients and other users, which may obtain information from the system manager module 112 regarding provided computing resources and otherwise generate a corresponding display for use on that client device, and/or may receive instructions to perform an indicated file system command on one or more indicated computing resources and send corresponding information to the system manager module 112. Additional details regarding providing a file system interface for network-accessible computing resources and associated functionality are described elsewhere herein, including with respect to the examples of FIGS. 2A-2D.

Each of the provided computer networks 122 may be configured in various ways by the clients for whom they are provided. In some situations, at least some such virtual computer networks may be created and configured as network extensions to existing remote private computer networks of clients, although in the illustrated embodiment the provided virtual computer networks are not shown to be connected to such other existing computer networks. In addition, at least some such virtual computer networks may each be a private computer network that is accessible only by the client that creates it, although in other embodiments at least some computer networks provided by the CNS online service 107 for clients may be publicly accessible.

In the illustrated example, each of the provided computer networks 122 includes multiple computing nodes (not shown), at least some of which are from the plurality of computing nodes 127 provided by or otherwise under the control of the CNS online service 107, while in other embodiments at least some other computing systems 137 may be used to provide some or all computing nodes for one or more of the provided computer networks 122—such other computing systems 137 may, for example, be provided by or under control of the client for whom a computer network 122 that uses those other computing systems 137 is provided, or may be computing systems that are provided by third parties (e.g., for a fee). For example, in at least some embodiments, each provided computer network 122 may include a client-configured quantity of multiple such computing nodes that are dedicated for use as part of that provided computer network. In particular, a client may interact with the module 112 to configure a quantity of computing nodes to initially be included in a computer network provided for the client (e.g., via one or more programmatic interactions with an API provided by the CNS online service 107). In addition, the CNS online service 107 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 112 to configure network addresses for a computer network provided for the client (e.g., via one or more programmatic interactions with an API provided by the CNS online service 107), and network addresses may later be dynamically added, removed or modified for a provided computer network of a client in at least some such embodiments, such as after the provided computer network has already been in use by the client. Furthermore, in at least some embodiments, a client may interact with the module 112 to configure network topology information for a computer network provided for the client (e.g., via one or more programmatic interactions with an API provided by the CNS online service 107), including to specify one or more virtual router devices or other virtual networking devices for the provided computer network, and such network topology information may later be dynamically modified for a provided computer network in at least some such embodiments, such as after the provided computer network has already been in use by the client. Moreover, in at least some embodiments, a client may interact with the module 112 to configure various network access constraint information for a computer network provided for the client (e.g., via one or more programmatic interactions with an API provided by the CNS online service 107), and such network access constraint information may later be dynamically modified for a provided computer network in at least some such embodiments, such as after the provided computer network has already been in use by the client.

In addition, in at least some embodiments, the computing nodes of the managed virtual computer networks may be physical computing systems and/or may be virtual machines that are each hosted on one or more physical computing systems, and the communications that are handled for managed virtual computer networks may include transmissions of data (e.g., messages, packets, frames, streams, etc.) in various formats. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center).

Thus, managed virtual computer networks may be provided for clients in various manners in various embodiments, and may be configured to have various types of functionality in various embodiments.

Figure 1B:
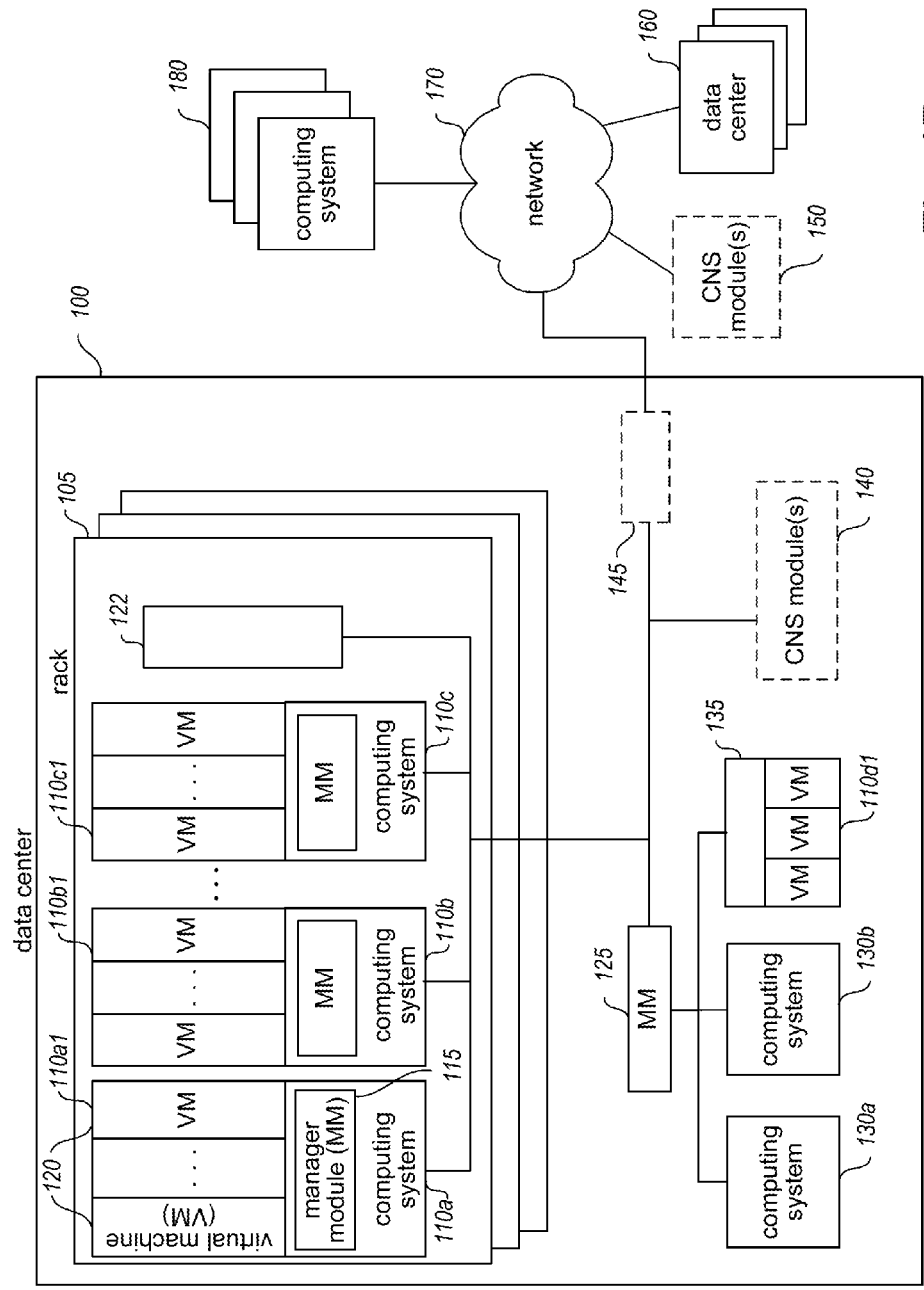

FIG. 1B is a block diagram illustrating an example embodiment in which the CNS online service of FIG. 1A uses one or more physical data centers to provide physical computing resources used in providing virtual computer networks to clients, including data center 100 and optionally one or more additional data centers 160. In this example, data center 100 comprises a number of computer racks 105, which each includes a number of physical computing machines or systems 110a-c and a rack support computing system 122. The computing machines or systems 110a-c in this example each provides one or more virtual machines 120, which each may be employed to provide an independent computing environment to host applications within the data center 100, and thus to act as a distinct computing node (e.g., one of the provided computing nodes 122 of FIG. 1A). In addition, the computing systems 110a-c each hosts a manager module 115 that manages the virtual machine nodes 120 hosted on that computing system, such as by acting as a hypervisor or machine monitor—in some embodiments, the manager modules 115 are configured by the CNS online service to further support the functionality provided by the CNS online service in various manners (e.g., to manage communications to and from the hosted virtual machine computing nodes that they manage in accordance with virtual computer networks to which those computing nodes belong). In this example embodiment, the rack support computing system 122 provides utility services for computing systems local to the rack (e.g., data storage services, network proxies, application monitoring and administration, etc.), as well as possibly other computing systems located in the data center, although in other embodiments such rack support computing systems may not be used. The computing systems 110a-c and the rack support computing system 122 of a rack in this example all share a common, high-speed, rack-level network interconnect (e.g., via a shared backplane, one or more hubs and/or switches that are physically local or remote to the particular rack, etc.), not shown.

In addition, the example data center 100 further comprises additional computing systems 130a-b and 135 that are not located on a rack, but share a common network interconnect to a manager module 125 associated with those additional computing systems, although in other embodiments such additional non-rack computing systems may not be present. In this example, computing system 135 also hosts a number of virtual machine nodes (e.g., for use as some of the provided computing nodes 122 of FIG. 1A), while computing systems 130a-b instead each act as a single physical machine computing node (e.g., for use as two of the provided computing nodes 122 of FIG. 1A). The manager module 125 similarly manages at least some operations (e.g., incoming and outgoing communications) for the associated virtual machine nodes hosted on computing system 135 and for computing system nodes 130a-b. An optional computing system 145 is also illustrated at the interconnect between the data center 100 local network and the external network 170 (e.g., the same network as network 102 of FIG. 1A), such as may be employed to provide a number of services (e.g., network proxies, the filtering or other management of incoming and/or outgoing data transmissions, etc.), including to manage outgoing data transmissions from some or all nodes internal to the data center 100 to nodes located in additional data centers 160 or other systems 180 external to the data center 100 and/or to manage incoming data transmissions to some or all internal nodes from external nodes. One or more modules of the CNS online service further operate to provide functionality of the online service, such as one or more modules 140 operating on one or more computing systems (not shown) within the data center 100 and/or one or more modules 150 operating on one or more computing systems (not shown) outside the data center 100—as noted elsewhere, client computing devices of clients or other users may also in at least some embodiments and situations execute a client module of the CNS online service that performs some or all of the described techniques for providing a file system interface for network-accessible computing resources and associated functionality. The example data center 100 is further connected to a number of other computing systems via the network 170, including additional computing systems 180 that may be client computing devices of clients of the CNS online service, additional data centers 160 that also may be operated by the operator of the data center 100 or third parties, etc.

As one illustrative example of functionality provided by the CNS online service, a client (not shown) of the CNS online service may use one of the computing systems 180 to interact with the CNS online service and configure a virtual computer network having four computing nodes, with a specified network topology for that virtual computer network having two logical subnets separated by a virtual computer network, although it will be appreciated that virtual computer networks may be much larger and have much more complicated network topologies. The CNS online service may then provide that virtual computer network for the client by selecting and provisioning one of the virtual machine computing nodes 120 on computing system 110a (in this example, virtual machine computing node 110a1) to be part of a first logical subnet of the provided virtual computer network along with one of the virtual machine computing nodes on computing system 135 (in this example, virtual machine computing node 110d1). The CNS online service may further manage communications sent between those computing nodes by forwarding those communications over the hardware of the data center 100, with that hardware and its interconnections acting as an underlying substrate network for the provided virtual computer network. Since computing nodes 110a1 and 110d1 are configured to be in the same logical subnet of the provided virtual computer network, they will send communications to each other as part of the same logical broadcast domain (without indicating to forward such communications over any intervening virtual router devices, since no virtual router devices of the provided virtual computer network exist between them)—however, the underlying substrate network of the data center may include various physical routers (not shown) and other equipment used to actually forward such communications.

To provide the specified virtual computer network, the CNS online service may further select and provision virtual machine computing node 110c1 on computing system 110c and physical computing system computing node 130a to be part of the second logical subnet of the provided virtual computer network, and may further configure some or all of manager module 125 and the manager modules 115 on computing systems 110a and 110c to provide the specified virtual router device of the provided computer network by emulating functionality of that virtual router device (e.g., in a distributed manner based on actions of multiple of the manager modules). For example, if computing node 110c1 of the second logical subnet sends a communication to computing node 110a1 of the first logical subnet, one or both of the manager modules 115 on computing systems 110c and 110a may operate to forward the communication directly from computing node 110c1 to computing node 110a1 without actually forwarding that communication via the configured virtual router device (since it is not physically provided), but may further perform one or more modifications to the communication as it is forwarded that correspond to activities that the configured virtual router device would have performed if it was physically provided and located between the subnets (e.g., to modify the header of the communication, such as to reflect a hop that the communication should have participated in when being forwarded by such a virtual router device). Thus, the CNS online service may perform various operations to support the virtual computer network being provided to the client, while simultaneously providing virtual computer networks and/or other computing resources to other clients (e.g., with virtual machine computing node 110b1 being part of a second virtual computer network being provided to a second client).

Figure 2A:
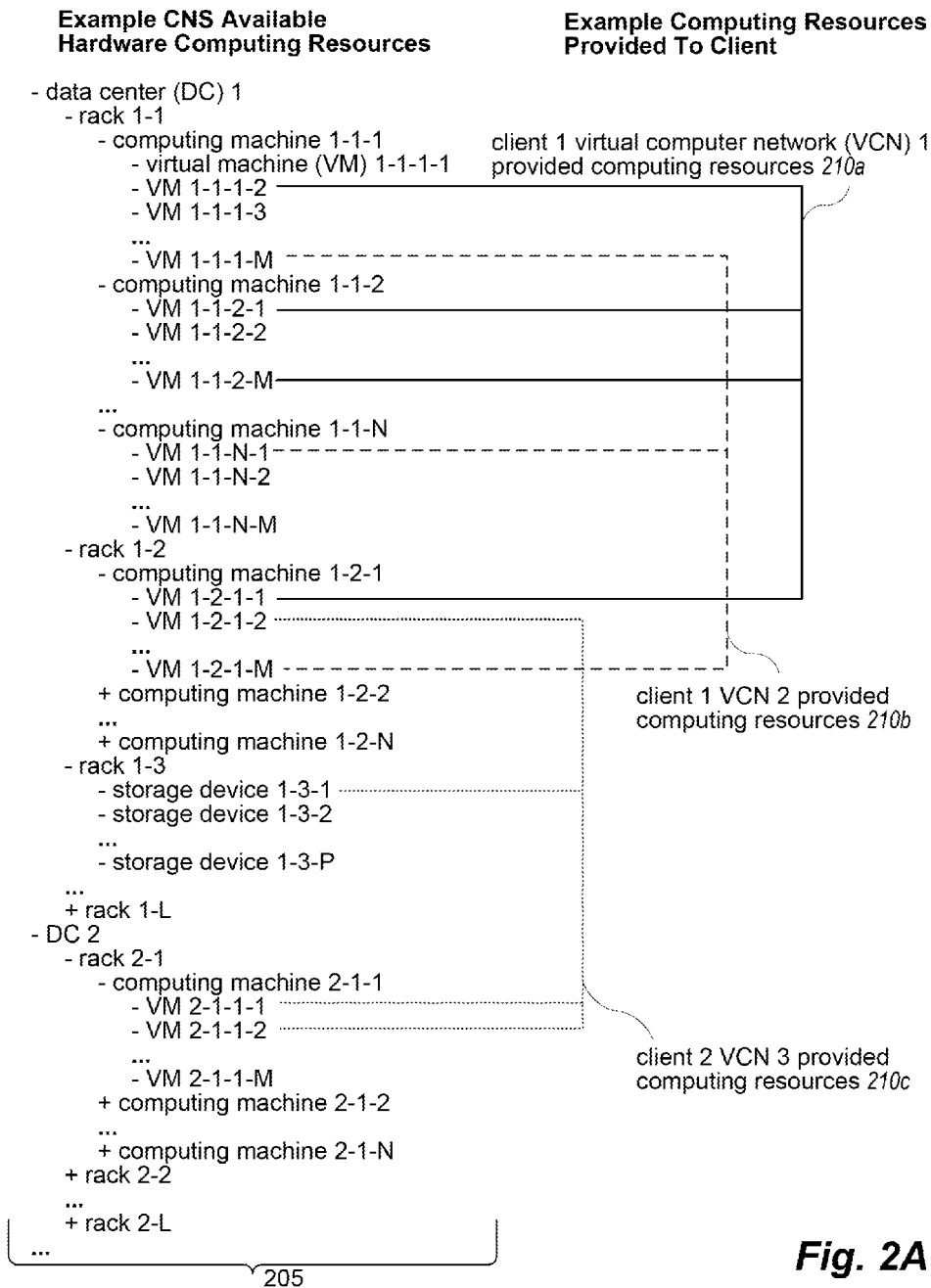
FIGS. 2A-2D illustrate examples of providing a file system interface for network-accessible computing resources and associated functionality.

FIGS. 2A-2D illustrate examples of providing a file system interface for network-accessible computing resources and associated functionality. In particular, FIG. 2A illustrates example information 205 regarding various physical computing resources that may be provided and used by an example embodiment of the CNS online service. In this example, the CNS online service uses at least two data centers, with various details being shown in a hierarchical manner for each of two data centers. For example, with respect to a first example data center ("data center 1"), it is illustrated to include L computing racks which each include physical computing machines or other hardware devices. With respect to a first example computing rack ("rack 1-1") of data center 1, it includes N physical computing machines, with each of those physical computing machines including M hosted virtual machine hardware resource groups. The second example computing rack ("rack 1-2") of data center 1 similarly includes N physical computing machines each hosting M virtual machine hardware resource groups, while the third example computing rack ("rack 1-3") of data center 1 instead includes P storage devices. It will be appreciated that various types of hardware computing resources may be grouped and aggregated in other manners in other embodiments.

FIG. 2A further illustrates information about three example virtual computer networks 210 being provided to two clients using the hardware computing resources 205. In particular, a first client ("client 1") is being provided a first virtual computer network ("VCN 1") 210a with four computing nodes, which in this case are virtual machines 1-1-1-2, 1-1-2-1, 1-1-2-M and 1-2-1-1 on three computing machines in two computing racks of data center 1 (with virtual machines 1-1-2-1 and 1-1-2-M both being provided on hosted virtual machines of computing machine 1-1-2 of rack 1-1). In addition, client 1 is also being provided a second virtual computer network ("VCN 2") 210b with three computing nodes on three computing machines in two computing racks of data center 1, which in this case are virtual machines 1-1-1-M, 1-1-N-1 and 1-2-1-M—in some embodiments and situations, VCN 1 and VCN 2 may be configured to inter-communicate with each other in specified manners, while in other embodiments and situations such virtual computer networks may be completely separate. The example virtual computer networks being provided further include a third virtual computer network ("VCN 3") 210c being provided to a second client ("client 2") using four nodes spread across two data centers and three computing racks, including virtual machine 1-2-1-2 on computing machine 1-2-1 of rack 1-2 of data center 1, virtual machines 2-1-1-1 and 2-1-1-2 on computing machine 2-1-1 of rack 2-1 of data center 2, and storage device 1-3-1 of rack 1-3 of data center 1. While VCNs 1 and 2 are not illustrated in this example as including any storage nodes, storage may nonetheless be available to the computing nodes of the VCNs, such as if some or all virtual machine computing nodes include storage (not shown) local to the computing node and/or if a remote storage service (not shown) is used to provide storage capabilities to some or all such virtual machine computing nodes. It will be appreciated that virtual computer networks may be structured in other manners in other embodiments, including to have much larger numbers of computing nodes, to further include additional computing resources (e.g., virtual router devices or other virtual networking devices, virtual network interfaces, etc.).

Figures 2B, 2C:
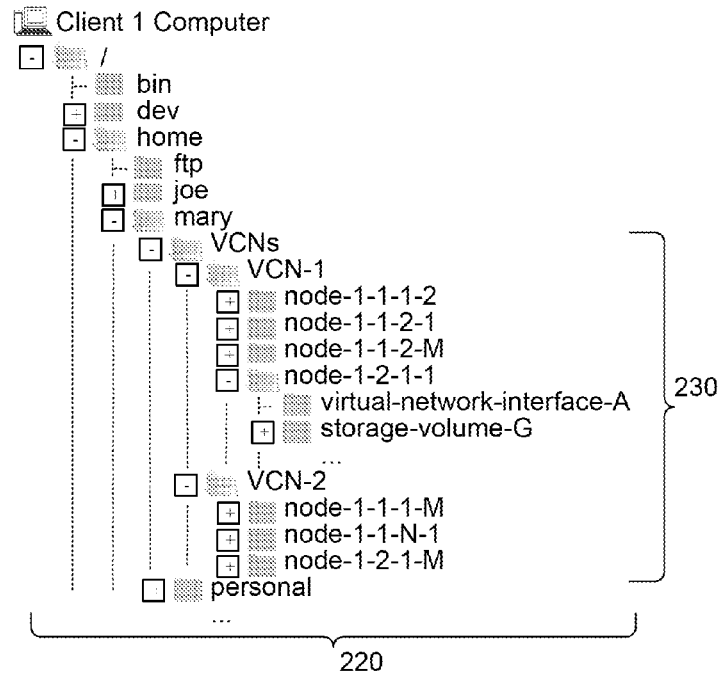

FIG. 2B continues the example of FIG. 2A, and in particular illustrates a visual representation 220 that may be displayed on a client computing device (not shown, labeled "client 1 computer") being used by client 1, with the visual representation including information about an existing actual file system on the client computing device, and being modified to include information 230 to represent the two virtual computer networks being provided to client 1 in FIG. 2A. The visual representation 230 may be displayed by, for example, a Web browser or other standard presentation program (not shown) that is executing on the client computer device (based on information sent to the program by the CNS online service), or by a client module (not shown) of the CNS online service executing on the client computer device (e.g., a modified shell program).

In particular, in this example, client 1 corresponds to a user "mary" on the client computing device, and the information 230 about the virtual computer networks has been added inside a corresponding user directory that actually exists on the client computing device. Thus, while the existing file system on client computing device does not actually have a directory or folder labeled "VCNs" under the "mary" user directory, the visual representation 220 has been modified to show such a directory. In addition, the displayed visual representation 220 is an interactive user interface in this example, such that a user of the client device can, for example, click on the plus sign to the left of the "personal" folder/directory visual representation to expand the contents and see information about that folder/directory in the actual existing file system, click on the minus sign to the left of the "VCNs" folder/directory visual representation to shrink the display and not see the logical contents of that non-existent folder/directory, right-click or otherwise select the "VCNs" folder/directory to access additional functionality corresponding to that non-existent folder/directory, etc.

In this example, a hierarchical representation of client 1's virtual computer networks and their provided computing resources has further been generated and displayed under the added visual representation of the non-existent "VCNs" directory, with a first hierarchical level including two directories or folders representing the two provided virtual computer networks and labeled "VCN-1" and "VCN-2". A next level of the hierarchical representation corresponds to nodes within the provided virtual computer networks, with the "VCN-1" directory or folder corresponding to VCN 1 210a of FIG. 2A and including 4 sub-folders or sub-directories corresponding to the four computing nodes that are part of VCN 1 210a, and which are implemented by the virtual machines 1-1-1-2, 1-1-2-1, 1-1-2-M and 1-2-1-1 in data center 1 of FIG. 2A. In addition, in this example, the hierarchical representation includes at least one additional level, which corresponds to particular computing resources being provided with or associated with particular computing nodes—for example, with respect to folder or directory "node-1-2-1-1" (corresponding to virtual machine 1-2-1-1 of computing machine 1-2-1 of rack 1-2 of data center 1), that folder/directory includes at least two sub-folders or sub-directories corresponding to a virtual network interface assigned to that computing node and a storage volume provided on that computing node (e.g., using storage local to that computing node, to represent a logical storage volume that is actually provided using a remote storage service, etc.). Thus, this example further illustrates that such a hierarchical representation may in some embodiments and situations include a mix of physical computing resources provided by the CNS online service (e.g., node-1-2-1-1, corresponding to virtual machine 1-2-1-1 group of hardware resources) and virtual computing resources provided by the CNS online service (e.g., virtual network interface A, which may be a logical construct created and used by the CNS online service). It will be appreciated that a file system may be visually represented in other manners, and that user interactions with such visual representations may be performed in various manners in various embodiments.

FIG. 2C continues the examples of FIGS. 2A-2B, and in particular illustrates an interactive textual interface 240 with which a user of the client computer device can specify file system commands, including with respect to various of the information shown in the portion 230 of the visual representation 220 that is not actually part of the existing actual file system on the client device. The textual interface 240 may be displayed by, for example, a Web browser or other standard presentation program (not shown) that is executing on the client computer device (based on information sent to the program by the CNS online service), or by a client module (not shown) of the CNS online service executing on the client computer device (e.g., a modified shell program). In this example, the file system commands are shown using a Unix or Linux type operating system, although other operating system file commands may be used in other embodiments.

In particular, the textual interface 240 includes a series of user-specified file system commands 240 and corresponding response information (when appropriate) to the commands. The file system commands in this example include command 240a to perform "rm VCN-1/node-1-1-2-M", such as to cause the indicated computing node to be removed from VCN 1 of FIG. 2A, with a corresponding series of multiple operations being performed by the CNS online service to accomplish that file system command, as discussed in greater detail previously. The file system commands in this example further include command 240b to perform "my VCN-1/node-1-1-1-2 VCN-2", such as to cause the indicated computing node to be moved from VCN 1 to VCN 2 of FIG. 2A, with a corresponding series of multiple operations being performed by the CNS online service to accomplish that file system command, as discussed in greater detail previously. Thus, if a listing of the contents of folder/directory "VCN-1" of FIG. 2B were performed after having performed file system commands 240*a* and 240*b*, the results would show only two sub-folders/sub-directories of "node-1-1-2-1" and "node-1-2-1-1".

The file system commands in this example also include command 240*c* to perform "grep '159.23.17.*' *.*", such as to cause a search of the provided computing resources in the hierarchy under the "VCN-1" folder/directory visual representation for ones that include associated information matching "159.23.17.*", such as to match "virtual-network-interface-A" based on it being assigned a matching IP address, and with a corresponding series of multiple operations being performed by the CNS online service to accomplish that file system command, as discussed in greater detail previously. The information 240 further shows results that indicate the match being found. Example file system command 240*d* further illustrates that the same file system command (here "mv") may be applied to a different type of computing resource (here a virtual network interface rather than a computing node), as compared to example file system command 240*b*, and with a different corresponding series of one or more operations being performed by the CNS online service to accomplish that file system command, as discussed in greater detail previously. Example file system command 240*e* further illustrates that various types of information may be retrieved and specified about indicated computing resources (here a particular computing node), although particular details of the response information for the file system command are not illustrated in this example. It will be appreciated that various other file system commands may be specified in other manners and with other types of visual representations in various embodiments.

Figure 2D:
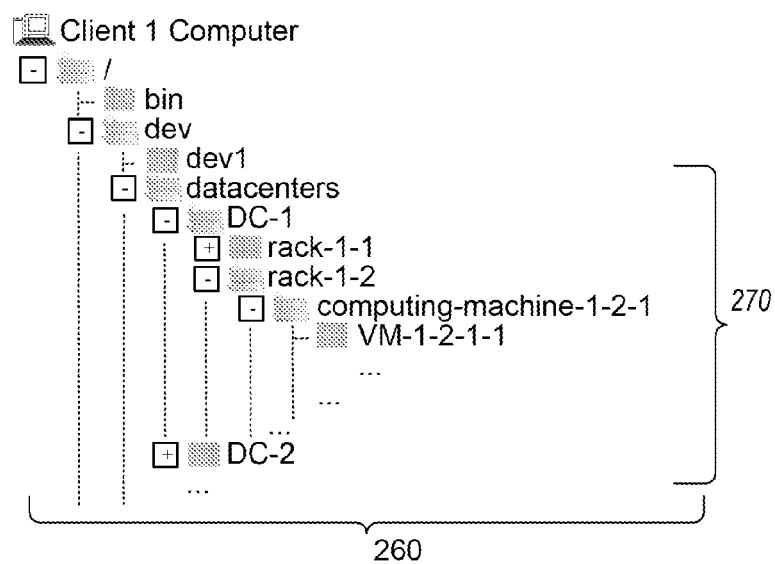

FIG. 2D continues the examples of FIG. 2A-2D, and in particular illustrates an alternative visual representation 260 that may be displayed on the client device, based on a different type of hierarchical representation of some or all of the hardware computing resources provided by the CNS online service. As with visual representation 220 of FIG. 2B, the visual representation 260 includes information about the existing actual file system on the client computing device, but it is modified in this example to include information 270 representing at least some of the hardware computing resources provided by the CNS online service in FIG. 2A. In other embodiments, information corresponding to both hierarchical representations 230 and 270 may be displayed at the same time, while in other embodiments at least one of the hierarchical representations may not be used.

In particular, the hierarchical representation shown in information 270 includes levels corresponding to the physical arrangement of hardware computing resources provided by the CNS online service, and is added in this example under the "dev" folder of the existing actual file system, such as if the two data centers used by the CNS online service have been physically mounted on the client device. In particular, the hierarchical representation includes a first "datacenters" folder or directory, with a first hierarchical level including two directories or folders representing the two data centers and labeled "DC-1" and "DC-2". A next level of the hierarchical representation corresponds to computing racks within the data centers, with the "DC-1" directory or folder corresponding to data center 1 of FIG. 2A and including L sub-folders or sub-directories (with two shown) corresponding to the L computing racks of data center 1. In addition, in this example, the next level of the hierarchical representation corresponds to computing machines within racks, with some of the rack folders or directories including N sub-folders or sub-directories (with one shown for rack "rack-1-2") corresponding to the N computing machines on those racks, and with rack-1-3 (not shown) including P sub-folders or sub-directories (not shown) corresponding to the P storage devices on that rack. Furthermore, the hierarchical representation in this example includes at least one additional level, which corresponds to particular virtual machines being hosted on particular computing machines, with each of the computing machine folders or directories including M sub-folders or sub-directories (with one shown for computing machine "computing-machine-1-2-1") corresponding to the M hosted virtual machines on those computing machines. It will be appreciated that provided computing resources may be represented using various types of hierarchical representations, including ones different than those illustrated in FIGS. 2B and 2D.

It will also be appreciated that the examples of FIGS. 2A-2D are included for exemplary purposes and are non-limiting, and that other types of computing resources, file systems, interactive interfaces and hierarchical representations may be used in other embodiments.

Figure 3:
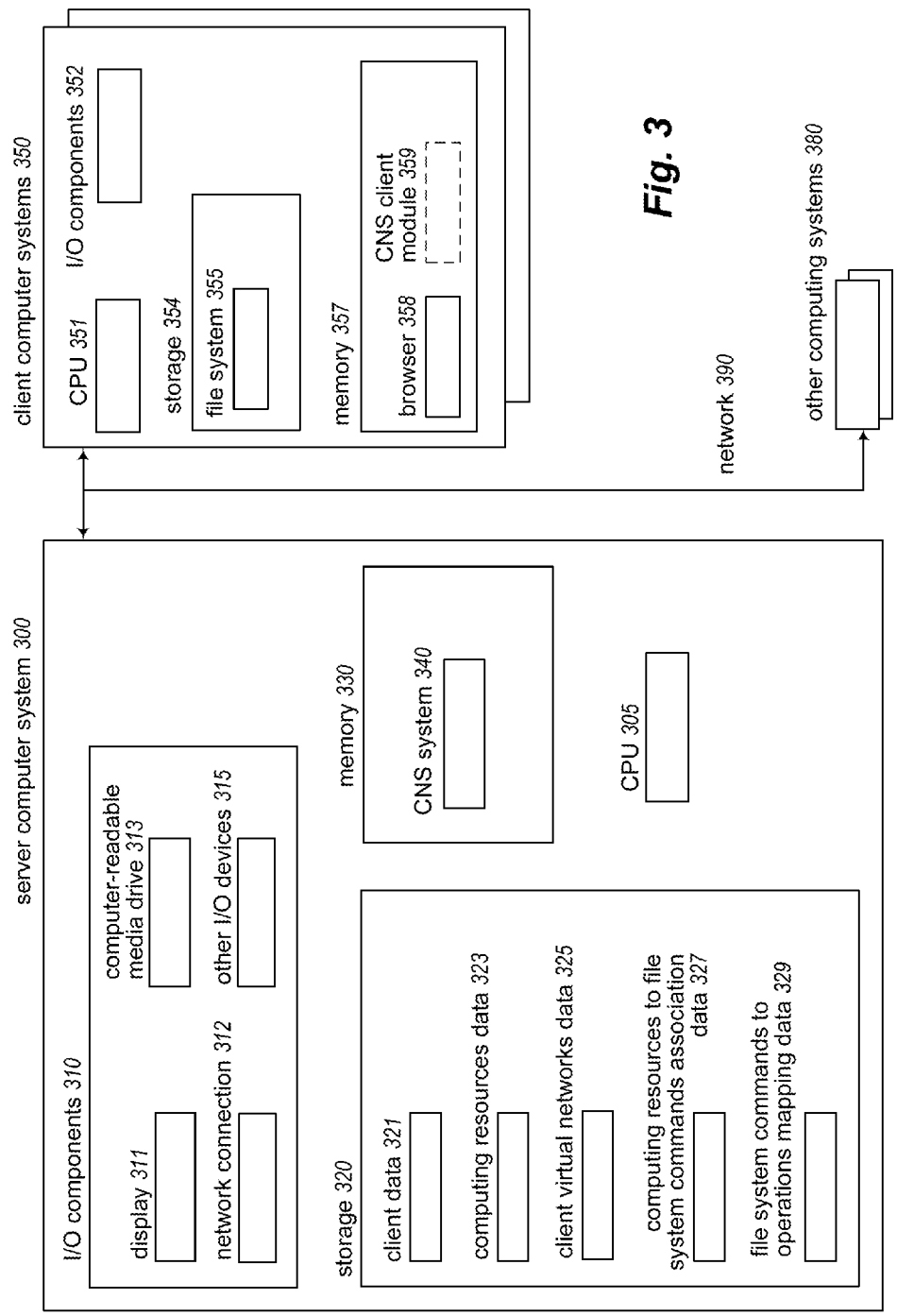
FIG. 3 is a block diagram illustrating example computing systems suitable for executing an embodiment of a system for providing a file system interface for network-accessible computing resources and associated functionality.

FIG. 3 is a block diagram illustrating example computing systems suitable for performing the described techniques for providing a file system interface for network-accessible computing resources and associated functionality. In particular, FIG. 3 illustrates a server computing system 300 suitable for performing automated operations to provide at least some of the described techniques, including to operate a CNS (configurable network service) system 340 that provides an embodiment of the CNS online service with which the described techniques will be used in this embodiment, although in other embodiments the described techniques may be used in other environments that do not include the CNS online service. FIG. 3 also illustrates various client computer systems 350 that may be used by users of the CNS online service, and other computing systems 380 (e.g., computing systems that are used by the CNS online service to provide virtual computer networks and other computing resources, such as in one or more data centers, not shown).

In the illustrated embodiment, the server computing system 300 has components that include one or more hardware CPU ("central processing unit") computer processors 305, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more CPUs 351, I/O components 352, storage 354, and memory 357, although some details are not illustrated for the computing systems 350 for the sake of brevity. The other computing systems 380 may also each include components that are similar to some or all of the components illustrated with respect to server computing system 300, including to divide provided hardware resources among multiple hosted virtual machines, but such components are not illustrated in this example for the sake of brevity.

One or more modules of the CNS system 340 (e.g., modules 112 and/or 117 of FIG. 1A, module 114 of FIG. 1A, modules 140 and 150 of FIG. 1B, etc.) are executing in memory 330 to provide an embodiment of the CNS online service, and in some embodiments each includes various software instructions that, when executed, program one or more of the CPU processors 305 to provide the described functionality. The module(s) of the system 340 interact with computing systems 350 and 380 over the network 390 (e.g., via the Internet and/or the World Wide Web, via a private cellular network, etc.). Various information related to the functionality of the system 340 may be stored in storage 320 and used by the system 340 during its operation, such as the following: information 322 related to particular clients (e.g., their account information, specified configuration information for their provided computing resources, etc.); information 325 related to particular virtual computer networks being provided to clients (e.g., particular computing resources used by the virtual computer networks, specified network topologies and other specified configuration information for the virtual computer networks, etc.); information 323 related to particular computing resources (e.g., information about other computing resources being provided to clients, information about additional computing resources that are available to be used as such provided computing resources, etc.); information 327 related to which file system commands are available to be used with which computing resource types or particular computing resources (e.g., as manually specified by an operator of the CNS online service, or otherwise automatically determined); information 329 related to which operations are mapped to particular combinations of file system commands and particular computing resource types or particular computing resources (e.g., as manually specified by an operator of the CNS online service, or otherwise automatically determined); etc.

The other computing systems 350 and 380 may be executing various software as part of interactions with the module(s) of system 340. For example, client computer systems 350 may each be executing software in memory 357 to interact with system 340, such as a Web browser 358 and/or one or more specialized client-side programs 359 (e.g., a client module of the CNS online service, such as a specialized shell program), including to request computing resources from the CNS online service and to interact with or otherwise use such computing resources. The software executing on the client computer systems 350 may further participate in providing some or all of the described techniques, including to display or otherwise provide visual representations of provided computing resources using a file system visual interface and/or to display or otherwise provide an interactive interface via which a user of the client computer system can specify file system commands to be performed for indicated computing resources, as discussed in greater detail elsewhere.

It will be appreciated that computing systems 300, 350 and 380 are merely illustrative and are not intended to limit the scope of the present invention. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the system 340 may in some embodiments be distributed in one or more modules, as described elsewhere herein. Similarly, in some embodiments some of the functionality of the system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the system 340 and/or the module(s) 359) and/or data structures, such as by execution of software instructions of the one or more software programs and/or by storage of such software instructions and/or data structures. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
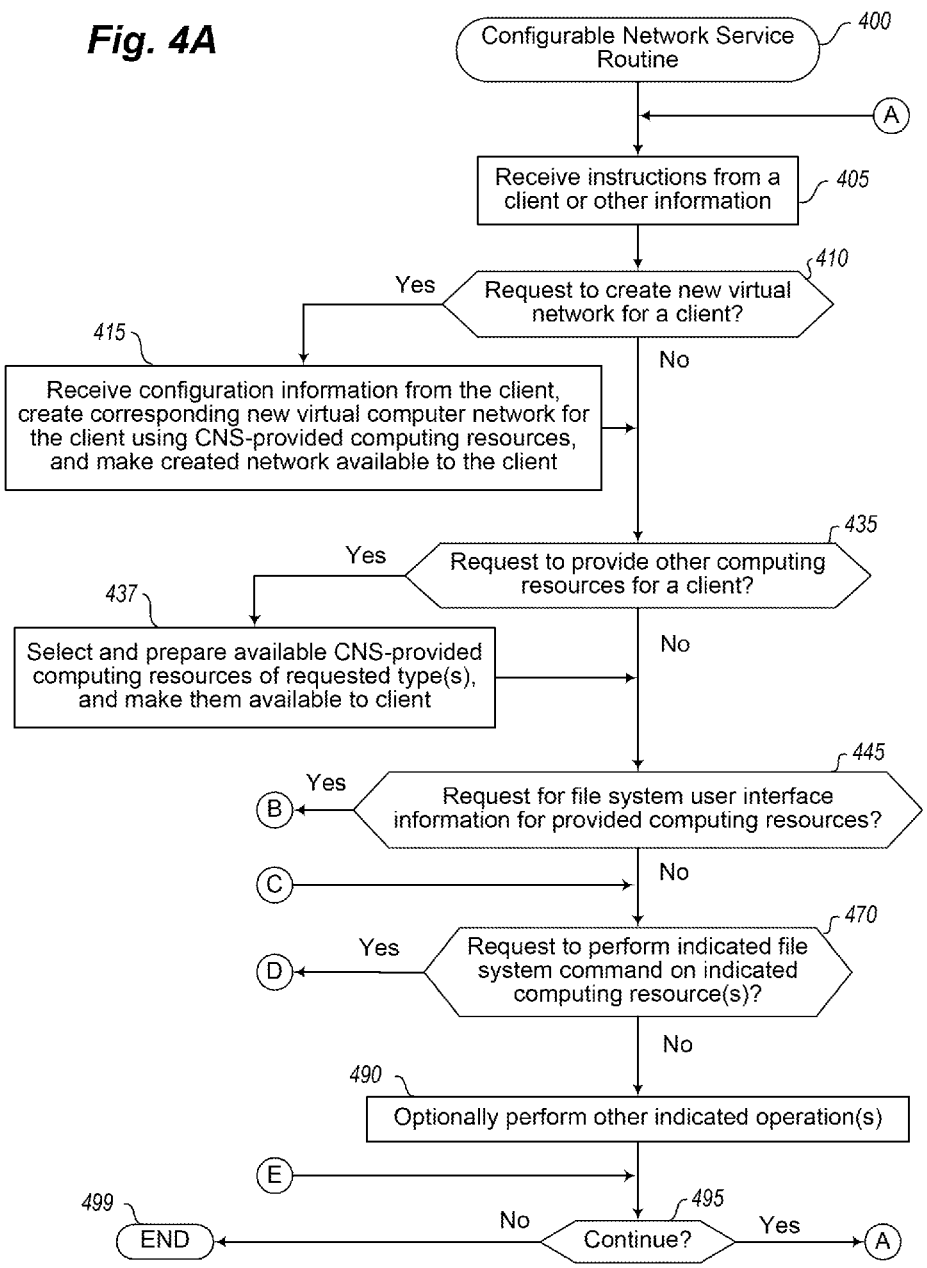

FIGS. 4A-4B are a flowchart of an example embodiment of a CNS online service routine 400. The routine may be provided by, for example, execution of the CNS system 340 of FIG. 3, the modules 112, 114 and 117 of FIG. 1A, the modules 140 and 150 of FIG. 1B, and/or the CNS online service discussed with respect to FIGS. 2A-2D, such as to perform the described techniques for providing a file system interface for network-accessible computing resources and associated functionality. While the described techniques for providing a file system interface for network-accessible computing resources and associated functionality are discussed in this example as being provided by the CNS online service, it will be appreciated that such functionality (including some or all of the functionality discussed with respect to blocks 445-490) may be provided by a distinct system from the CNS online service in other embodiments, such as in conjunction with one or more separate online services or otherwise with respect to provided computing resources and associated functionality.

In the illustrated embodiment, the routine begins at block 405, where a request from a client or other information is received. The routine continues to block 410 to determine whether a request received in block 405 is to create a new virtual computer network for a client, and if so continues to block 415. In block 415, the routine receives configuration information from the client, determines whether the client is authorized for the request (e.g., based on providing required fees, if any; based on previous registration activities of the client with the online service; etc.) and declines the request if not, and otherwise creates a corresponding new virtual computer network for the client using computing resources provided by the CNS online service, and makes the created virtual computer network available to the client. Additional details related to providing virtual computer networks to clients are described elsewhere herein.

After block 415, or if it is instead determined in block 410 that a request is not received in block 405 to create a new virtual computer network for a client, the routine continues to block 435 to determine whether a request received in block 405 is to provide other computing resources for a client (e.g., that are not part of providing a virtual computer network), and if so continues to block 437. In block 437, the routine receives information from the client regarding the requested computing resources, determines whether the client is authorized for the request (e.g., based on providing required fees, if any; based on previous registration activities of the client with the online service; etc.) and declines the request if not, and otherwise selects and prepares corresponding computing resources provided by the CNS online service (e.g., storage services, program execution services, etc.), and makes the prepared computing resources available to the client. Additional details related to providing computing resources to clients are described elsewhere herein.

After block 437, or if it is instead determined in block 435 that a request is not received in block 405 to provide other computing resources for a client, the routine continues to block 445 to determine whether a request received in block 405 is to provide information for display about provided computing resources with a visual representation of a file system, and if so continues to block 450. In block 450, the routine identifies provided computing resources of one or more types for which to display information to the requester. For example, if the request is made on behalf of a client (e.g., by an authorized user for the client), the provided computing resources may be selected to be those computing resources provided to that client, unless the requester specifies a subset of those computing resources (in which case the resources of that subset are identified). In addition, if the request is made on behalf of an authorized user for the online service that is not affiliated with a particular client, the provided computing resources may be selected to be all computing resources provided by the online service, unless the requester specifies a subset of those computing resources (in which case the resources of that subset are identified) and/or the requester is only authorized to obtain information about some of those provided computing resources (in which case those some resources are identified). After block 450, the routine continues to block 455 to generate a hierarchical representation of the identified computing resources, with each hierarchy level corresponding to a different resource type that is included within a resource of a type at a next-higher level. If multiple hierarchical representation types are available, a single one may be selected (e.g., as specified by the requester based on the types of computing resources being provided, based on a default, etc.), or instead multiple such hierarchical representations may be generated to reflect the different types. In block 460, the routine then continues to generate information for a visual representation of a file system in which the one or more generated hierarchical representations are included, with the visual representation including user-selectable controls to allow a user to manipulate the visual representation when it is displayed (e.g., to expand or contract a hierarchical level, to obtain additional information about one or more displayed elements that are selected, etc.), and provides the generated information to the requester for display. Additional details are described elsewhere herein related to providing information for display about provided computing resources with a visual representation of a file system.

After block 460, or if it is instead determined in block 445 that a request is not received in block 405 to provide information for display about provided computing resources with a visual representation of a file system, the routine continues to block 470 to determine whether a request received in block 405 is to perform an indicated file system command on one or more indicated computing resources, and if so continues to block 475. In block 475, the routine obtains information about the indicated file system command and the one or more indicated computing resources, such as from the request received in block 405 or as is otherwise specified. In block 480, the routine then determines one or more operations that correspond to performing the indicated file system command on the indicated computing resource(s), such as based on stored information about operations previously mapped to a combination of the file system command and a type of the one or more indicated computing resources, or as may be otherwise determined (e.g., by learning such operations by observing repeated actions of users in performing a type of functionality for a type of computing resource)—in some embodiments and situations, a sequence of multiple operations may be determined. In block 485, the routine then performs the determined operations for each of the indicated computing resources, and optionally provides information to the requester about results (if any) of the operations. While the functionality described with respect to blocks 470-485 is discussed with respect to a single file system command at a time for one or more computing resources of a single type, it will be appreciated that in other embodiments and situations a request may specify a combination of multiple file system commands and/or may specify computing resources of multiple types, and the routine may perform some or all of blocks 475-485 multiple times as needed to satisfy the request. Additional details are described elsewhere herein related to performing an indicated file system command on one or more indicated computing resources.

If it is instead determined in block 470 that the request or other information received in block 405 is of another type, the routine continues instead to block 490 to perform one or more other indicated operations as appropriate. For example, in some embodiments, the routine may receive requests to manipulate provided computing resources that are made without using file system commands (e.g., via a corresponding API provided by the online service), and if so may perform activities to satisfy such requests if they are authorized. Other types of operations performed with respect to block 490 may include performing operations to register new clients, and/or determining and storing information about authorizations for particular clients and users (e.g., based on information from clients to specify authorized users for the client with corresponding authorized activities, based on information from an operator of the online service to specify system administrator users employed by the online service or other users who are authorized representatives of the online service with corresponding authorized activities, etc.), such as for later use in determining whether to authorize requests on behalf of such clients or other users. In addition, operations performed with respect to block 490 in some embodiments may include obtaining and storing information for use in later providing the file system interface for network-accessible computing resources and associated functionality, such as information about which file system commands are available for use with which computing resource types or otherwise with particular computing resources, information about which operations are mapped to particular combinations of file system commands and corresponding resource types or resources (or merely to file system commands, if the same operations are performed on all computing resources for that file system command), etc. —such information may be provided by, for example, an operator of the online service as initial configuration information for the online service, or may otherwise be determined in some embodiments. In addition, in embodiments in which some or all of the functionality for providing the file system interface for network-accessible computing resources and associated functionality is implemented in client modules executing on client computing devices, other operations performed with respect to block 490 may include receiving requests from such client modules for information about provided computing resources, and providing corresponding response information, and/or may include receiving instructions from such client modules to perform particular operations based on a file system command having been specified on the client module, and performing corresponding functionality. Various other operations may similarly be performed with respect to block 490 as appropriate.

After blocks 460, 485 or 490, the routine continues to block 495 to determine whether to continue, such as until an explicit indication to terminate is received. If it is determined to continue, the routine returns to block 405, and otherwise continues to block 499 and ends.

Figure 5A:
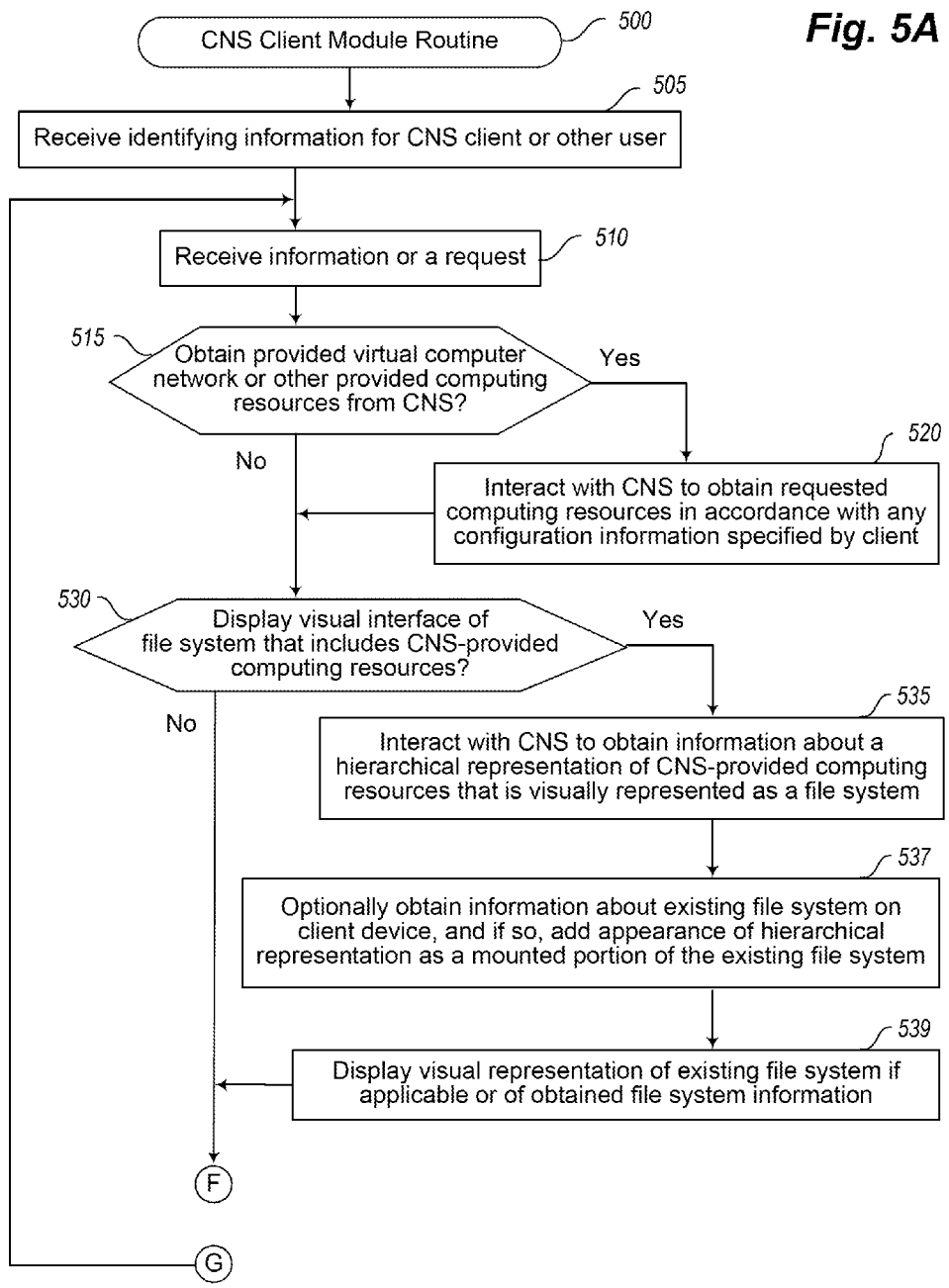
FIGS. 5A-5B illustrate a flow diagram of an example embodiment of a CNS Client Module routine.
Figure 5B:
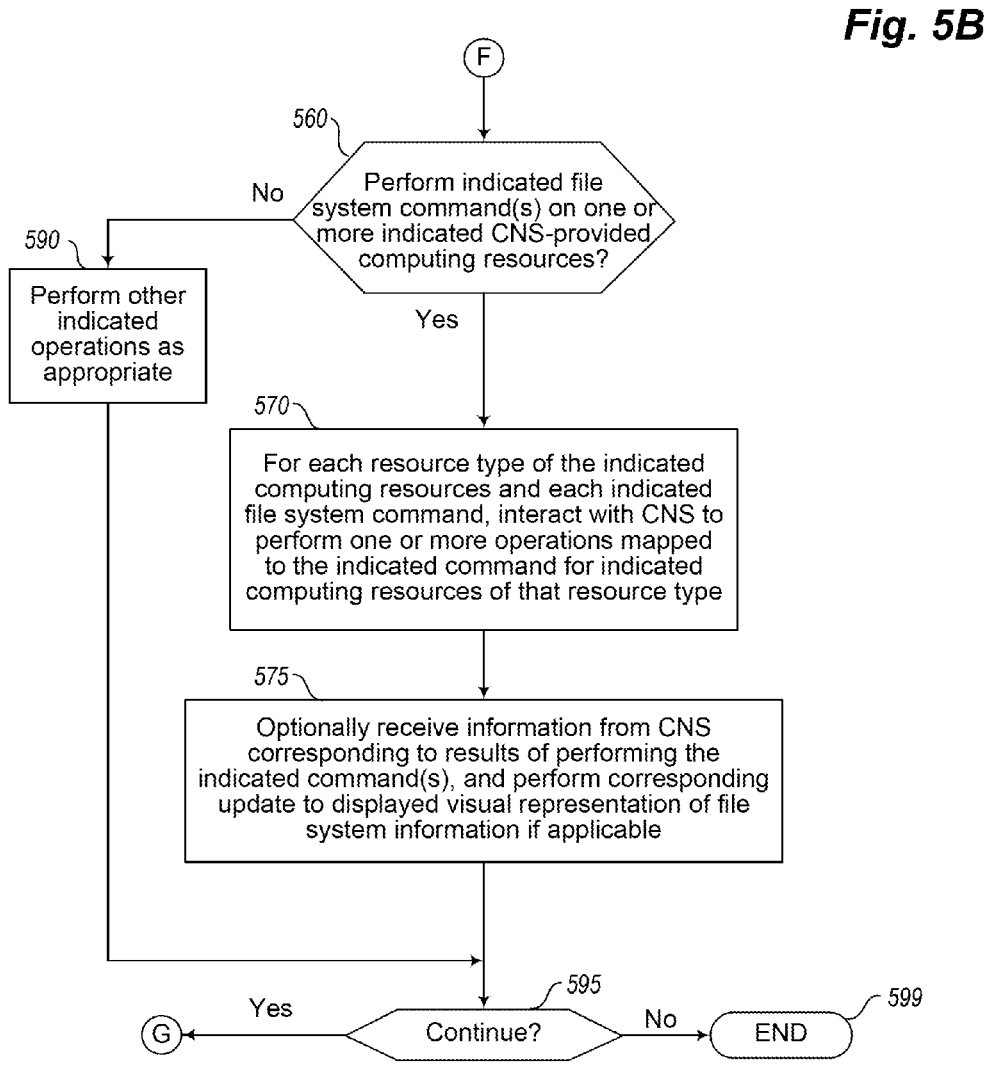

FIGS. 5A-5B are a flowchart of an example embodiment of a CNS Client Module routine 500. The routine may be provided by, for example, execution of the CNS client module 359 of FIG. 3, and/or a CNS client module as discussed with respect to FIGS. 1A-2D, such as to perform some or all of the described techniques for providing a file system interface for network-accessible computing resources and associated functionality. While the described techniques for providing a file system interface for network-accessible computing resources and associated functionality are discussed in this example as being provided by the CNS online service, it will be appreciated that such functionality (including some or all of the functionality discussed with respect to blocks 505-590) may be provided by a distinct system from the CNS online service in other embodiments, such as in conjunction with one or more separate online services or otherwise with respect to provided computing resources and associated functionality.

In the illustrated embodiment, the routine begins at block 505, where identifying information is obtained for a client of the CNS service or other user with whom this copy of the routine is associated (e.g., for a user of the client device on which the routine 500 is executing, such as login information for the CNS service or a unique identifier issued by the CNS service to the user). If the associated user does not yet have such identifying information, the routine may further perform operations to interact with the CNS service to register the user or otherwise obtain such identifying information.

After block 505, the routine continues to block 510 to receive a request from the user or other information. The routine then continues to block 515 to determine whether a request received in block 510 is to obtain a new virtual computer network or other computing resources provided by the CNS service, and if so continues to block 520. In block 520, the routine receives from the client configuration information or other information specifying the provided computing resources, and interacts with the CNS service to obtain the requested computing resources, such as in a manner analogous to that discussed with respect to blocks 415 and/or 435 of FIG. 4A.

After block 520, or if it is instead determined in block 515 that a request is not received in block 510 to obtain a new virtual computer network or other computing resources provided by the CNS service, the routine continues to block 530 to determine whether a request received in block 510 is to display an interactive user interface that includes a visual representation of a file system having information about provided computing resources, and if so continues to perform block 535 (e.g., in a manner analogous to blocks 450-460 of FIG. 4B). In particular, the routine in block 535 interacts with the CNS online service to obtain information about one or more hierarchical representations of at least some computing resources provided by the CNS online service for which the user is authorized to receive information (e.g., for some or all computing resources provided to a client is the user is representing the client, for some or all computing resources available from the CNS online service if the user is an authorized representative of the CNS online service, etc.), for display with a visual representation as a file system. In block 537, the routine optionally obtains information about an existing actual file system (if any) on the client device, and modifies that information to include the information obtained in block 535 as appearing to be a portion of the existing actual file system, such as if the provided computing resources were actually mounted in and accessible via the existing file system. In block 539, the routine then displays to the user on the client device the visual representation of the modified existing file system (if applicable) or otherwise of the file system information obtained in block 535.

After block 539, or if it is instead determined in block 530 that a request is not received in block 510 to display an interactive user interface that includes a visual representation of a file system having information about provided computing resources, the routine continues to block 560 to determine whether a request received in block 510 is to perform one or more indicated file system commands on one or more indicated computing resources of one or more types, and if so continues to perform block 570 (e.g., in a manner analogous to blocks 475-485 of FIG. 4B). In particular, the routine in block 570 interacts with the CNS online service, for each combination of an indicated file system command and a type of the indicated computing resource(s), to perform one or more operations that are mapped to that indicated file system command for the computing resources that are indicated of that type, such as based on stored information about such mapped operations, or as is otherwise determined. In block 575, the routine then optionally receives information from the CNS online service corresponding to results of performing the mapped operations for the indicated file system command(s), and if so performs a corresponding update (if applicable) to the visual representation of the file system information displayed with respect to block 539.

If it is instead determined in block 560 that the request or other information received in block 510 is of another type, the routine continues instead to block 590 to perform one or more other indicated operations as appropriate. For example, in some embodiments, the routine may receive requests to manipulate provided computing resources that are made without using file system commands, and if so may perform interactions with the CNS online service (e.g., via a corresponding API provided by the online service) to satisfy such requests if they are authorized. Other types of operations performed with respect to block 590 may include supplying information to the CNS online service about authorizations for a current client on whose behalf the current user is operating and/or for particular users, such as for later use in determining whether to authorize requests on behalf of the client or the other users. Various other operations may similarly be performed with respect to block 590 as appropriate.

After blocks 575 or 590, the routine continues to block 595 to determine whether to continue, such as until an explicit indication to terminate is received. If it is determined to continue, the routine returns to block 510, and otherwise continues to block 599 and ends.

As previously discussed, virtual computer networks that are provided for clients by a CNS online service may be configured in various manners in various embodiments. For example, network addresses may be configured for a provided computer network, such as by the client specifying one or more address ranges (e.g., a Classless Inter-Domain Routing ("CIDR") address block) or other groups of network addresses for the provided computer network, with at least some of the specified network addresses being used for the computing nodes of the provided computer network and/or for one or more online services integrated with the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 102 of FIG. 1A (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 102 (e.g., a public network address that is a static Internet-routable IP address or other non-changing network address). In other embodiments, the CNS online service may automatically select network addresses to be assigned to at least some computing nodes of at least some provided computer networks, such as based on network addresses that are available for use by the CNS online service, based on selecting network addresses that are related to network addresses used by remote existing computer networks corresponding to the provided computer networks, etc. Furthermore, if two or more of the computer networks provided by the CNS online service are configured to enable inter-communications between the provided computer networks (e.g., for two or more computer networks provided to a single customer, such as for different departments or groups within a single organization; for two or more computer networks provided to two or more distinct customers; etc.), the CNS online service may in some embodiments automatically select network addresses to be used for at least some computing nodes of those provided computer networks to facilitate the inter-communications, such as by using different network addresses for the various provided computer networks. In addition, in at least some embodiments in which the CNS online service provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS online service manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS online service may assign the network addresses to various of the computing nodes selected for the provided computer network, such as in a random manner, by using DHCP ("Dynamic Host Configuration Protocol") or other techniques for dynamic assignment of network addresses, etc.

Network topology information may also be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS online service may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS online service to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network of the CNS online service, and if so, some or all of the configured network topology information may be simulated or otherwise emulated in at least some such embodiments using the underlying substrate network and corresponding modules of the CNS online service. For example, each of the computing nodes provided by the CNS online service may be associated with a manager module of the CNS online service that manages communications to and from its associated computing node(s), and if so, the associated communication manager module for a computing node may take various actions to emulate desired functionality of a network with respect to that computing node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other computing systems external to the provided computer network, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS online service may enforce network access constraint information for provided computer networks in various manners.

In addition, as previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

In addition, various embodiments may provide mechanisms for client entities to interact with an embodiment of the CNS online service for the purpose of configuring computing nodes and external nodes. For example, some embodiments may provide an interactive console (e.g. a client application program providing an interactive user interface, a Web browser-based interface, etc.) from which users can manage the creation or deletion of virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS online service may be provided in exchange for fees from users or other entities acting as clients of the CNS online service, and if so the mechanisms for such clients to interact with an embodiment of the CNS online service may include functionality for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
identifying a plurality of computing resources of multiple resource types that are located together and are available to clients of an online service, and identifying, for each of the multiple resource types, one or more operating system file system commands to make available for computing resources of the resource type;
mapping, by a computing system of the online service and for each of the multiple resource types, each of the identified operating system file system commands for the resource type to operations that implement functionality of that identified operating system file system command for computing resources of the resource type;
providing, by the computing system and in response to a request from a first client, information for display by the first client in a visual interface about computing resources of the plurality;
receiving, by the computing system, information from the first client via the visual interface to execute an indicated operating system file system command for one of the resource types on an indicated computing resource of the one resource type; and
performing, by the computing system in response to the received information from the first client and on the indicated computing resource, the operations mapped to the indicated operating system file system command for the one resource type.

2. The computer-implemented method of claim 1 wherein the providing of the information for display includes providing information to the first client to create, as part of display of a file system on a client computing device of the first client, a visual representation of a portion of a data center in which the plurality of computing resources are located, despite the plurality of computing resources not being part of the file system.

3. The computer-implemented method of claim 2 wherein the providing of the information to create the visual representation of the portion of the data center includes providing information to represent computing resources provided for use by the first client as a hierarchy having multiple levels of computing resources of a plurality of resource types, and wherein the performing of the operations further includes performing the operations on each of two or more computing resources of the one resource type within a selected portion of the hierarchy.

4. A computer-implemented method comprising:
mapping, for an indicated type of computing resource and for each of one or more operating system file system commands, the operating system file system command to one or more application programming interfaces (APIs) exposed by a provider of an online service for operating on computing resources available for use by clients of the online service;
providing, by a computing system of the online service, one or more computing resources of an indicated type for use by a first client;
receiving, by the computing system, instructions from the first client to perform an indicated one of the operating system file system commands on at least one indicated computing resource of the provided computing resources; and
performing, by the computing system in response to the received instructions and on the at least one indicated computing resource, multiple operations to implement the one or more APIs mapped to the indicated one operating system file system command.

5. The computer-implemented method of claim 4 further comprising, before the receiving of the instructions from the first client, providing information about the provided computing resources of the indicated type for display to the first client using a visual representation of an indicated file system, wherein the provided computing resources of the indicated type are not part of the indicated file system.

6. The computer-implemented method of claim 5 wherein the providing of information for display to the first client includes sending the information over one or more computer networks to a client device of the first client that includes a file system implemented on the client device, to cause a display to the first client on the client device of the implemented file system that is modified to include the visual representation of the indicated file system as a subset of the implemented file system.

7. The computer-implemented method of claim 5 wherein the providing of information for display to the first client includes sending the information over one or more computer networks to a client device of the first client to cause a display to the first client on the client device of an interactive user interface, and wherein the receiving of the instructions from the first client is initiated based on one or more interactions of the first client with the displayed interactive user interface.

8. The computer-implemented method of claim 4 wherein the provided computing resources of the indicated type include a plurality of computing resources of multiple types that are provided to the first client by the online service, wherein a client device of the first client includes a file system implemented on the client device, and wherein the method further comprises providing information about the plurality of computing resources of the multiple types to the client device to cause a display on the client device of the implemented file system that is modified to include a representation of the plurality of computing resources as being a mounted subset of the implemented file system.

9. The computer-implemented method of claim 8 wherein the plurality of computing resources are provided by the online service from one or more data centers, and wherein the representation of the plurality of computing resources included in the modified display of the implemented file system is of the one or more data centers being the mounted subset of the implemented file system.

10. The computer-implemented method of claim 9 wherein the one or more data centers each includes physical resources that are arranged in the data center into multiple hierarchical groups, and wherein the representation of the plurality of computing resources included in the modified display of the implemented file system includes a hierarchy having multiple levels that each corresponds to at least one of the hierarchical groups.

11. The computer-implemented method of claim 8 further comprising generating the representation of the plurality of computing resources included in the modified display of the implemented file system to include a hierarchy having multiple levels that each corresponds to one of the multiple types of the computing resources, each of the levels of the hierarchy having one or more displayed elements that corresponds to one of the plurality of computing resources of the type for that level.

12. The computer-implemented method of claim 8 wherein the plurality of computing resources are part of a virtual computer network being provided by the online service to the first client, and wherein the representation of the plurality of computing resources included in the modified display of the implemented file system includes first visual elements corresponding to multiple hardware computing nodes of the virtual computer network and includes second visual elements corresponding to multiple virtual computing resources provided by the online service for use within the virtual computer network.

13. The computer-implemented method of claim 12 wherein the multiple virtual computing resources provided by the online service for use within the virtual computer network include multiple virtual network interfaces that are associated with at least some of the multiple hardware computing nodes.

14. The computer-implemented method of claim 4 wherein the one or more operating system file system commands include multiple file system commands each corresponding to one of multiple actions, wherein the multiple actions include removing an indicated computing resource, moving an indicated computing resource, displaying information associated with an indicated computing resource, and searching for one or more computing resources that match one or more indicated criteria, and wherein performance of operations for the one or more APIs mapped to each of the multiple file system commands include performing, by the online service, multiple activities involving manipulating the computing resources of the indicated type available from the online service to effect the action corresponding to the file system command.

15. The computer-implemented method of claim 4 wherein the indicated one operating system file system command includes specifying access control information associated with one or more users or groups, wherein the performing of operations for the one or more APIs mapped to the indicated one operating system file system command on the at least one indicated computing resource includes storing, by the online service, information about the specified access control information, and wherein the method further comprises applying the specified access control information to control one or more subsequent requests to access the at least one indicated computing resource.

16. The computer-implemented method of claim 4 wherein the at least one indicated computing resource includes a plurality of computing resources at multiple hierarchical levels, and wherein the performing of the multiple operations to implement the one or more APIs mapped to the indicated one file system command on the at least one indicated computing resource includes performing the multiple operations recursively on the plurality of computing resources at the multiple hierarchical levels.

17. A non-transitory computer-readable medium having stored contents that configure a computing system to:
  determine, for computing resources of an indicated type and for each of one or more file system commands associated with a file system, one or more operations for the file system command to use in implementing functionality associated with the file system command for the computing resources of the indicated type, wherein the computing resources of the indicated type are available for use by clients of an online service and are not part of the file system;
  provide, by the computing system, information to a user about the file system that includes indications of at least some of the computing resources of the indicated type;
  receive, by the computing system, instructions from the user to perform an indicated one of the file system commands on at least one indicated computing resource of the at least some computing resources; and
  initiate, by the computing system in response to the received instructions, performance of the one or more operations determined for the indicated one file system command on the at least one indicated computing resource.

18. The non-transitory computer-readable medium of claim 17 wherein the computing system is part of the online service, wherein the user is a client of the online service, and wherein the providing of the information includes providing information for display to the user about multiple computing resources of the indicated type that are provided by the online service to the user.

19. The non-transitory computer-readable medium of claim 18 wherein the determining of the one or more operations for the indicated one file system command includes mapping the indicated one file system command to a sequence of multiple operations, wherein the indicated one file system command is one of multiple file system commands available for use with the computing resources of the indicated type, and wherein the stored contents include software instructions that, when executed, further program the configured computer system to, in response to the received instructions, perform the sequence of multiple operations on the at least one indicated computing resource.

20. The non-transitory computer-readable medium of claim 17 wherein the user is an administrative user employed by the online service, wherein the computing resources of the indicated type are a subset of a plurality of computing resources of multiple types that are provided by the online service for use by the clients, and wherein the providing of the information includes providing information for display to the user about the plurality of computing resources of the multiple types.

21. The non-transitory computer-readable medium of claim 20 wherein the computing system is a client device of the user, and wherein the providing of the information includes displaying to the user a visual representation of a file system on the client device that is modified to include the provided information about the plurality of computing resources.

22. A system, comprising:
one or more processors of one or more computing systems; and
one or more modules that, when executed by at least one of the one or more processors, configure the at least one processors to manage provided computing resources by:
  obtaining, for computing resources of an indicated type and for each of one or more file system commands associated with a file system, information about one or more associated operations to use in implementing functionality corresponding to the file system command for the computing resources of the indicated type, wherein the computing resources of the indicated type are not part of the file system;
  providing, to a client of an online service, information about the file system that includes indications of multiple computing resources of the indicated type that are provided by the online service for use by the client;
  receiving instructions from the client to perform an indicated one of the file system commands on at least one indicated computing resource of multiple computing resources; and
  initiating, in response to the received instructions, performance of the one or more associated operations for the indicated one file system command on the at least one indicated computing resource.

23. The system of claim 22 wherein the system is part of the online service, wherein the obtaining of the information includes mapping the indicated one file system command to a sequence of multiple operations, and wherein the initiating performance of the one or more associated operations includes performing the sequence of multiple operations on the at least one indicated computing resource.

24. The system of claim 23 wherein the system further comprises a plurality of computing resources of multiple types that are available for use by clients of the online service and that include the computing resources of the indicated type, and wherein the one or more modules include software instructions that, when executed by the at least one processor, further configure the at least one processor to provide, to the client in response to one or more requests, multiple computing resources of two or more types that include the computing resources of the indicated type.

25. The system of claim 22 wherein the computing system is a client device of the client, wherein the providing of the information includes displaying to the client a visual representation of a file system on the client device that is modified to include the provided information about the multiple computing resources, and wherein the visual representation is part of a user interface on the client device that enables the client to perform, on the computing resources of the indicated type, multiple file system commands that include the indicated one file system command.

26. The system of claim 22 wherein the one or more modules consist of one or more means for performing the managing of the provided computing resources.

* * * * *